United States Patent
Kenney

[11] Patent Number: 5,346,630
[45] Date of Patent: Sep. 13, 1994

[54] COAL DEWATERING

[75] Inventor: Mark E. Kenney, South Perth, Australia

[73] Assignee: Unilever Patent Holdings B.V., Vlaardingen, Netherlands

[21] Appl. No.: 961,904

[22] PCT Filed: May 13, 1991

[86] PCT No.: PCT/GB91/00752
§ 371 Date: May 15, 1993
§ 102(e) Date: May 15, 1993

[87] PCT Pub. No.: WO92/20421
PCT Pub. Date: Nov. 26, 1992

[30] Foreign Application Priority Data

May 8, 1990 [AU] Australia ............... PK0018

[51] Int. Cl.$^5$ ............................................ B01D 33/62
[52] U.S. Cl. ........................... 210/770; 44/564; 210/728; 210/729; 210/778
[58] Field of Search ............ 210/725, 727, 728, 729, 210/770, 772, 777, 778; 44/564, 568; 252/60, 61

[56] References Cited

U.S. PATENT DOCUMENTS

| | | | |
|---|---|---|---|
| 1,512,499 | 10/1924 | Stenning et al. | 44/568 |
| 4,210,531 | 7/1980 | Wang et al. | 210/727 |
| 4,410,431 | 10/1983 | Roe | 210/728 |
| 4,892,663 | 1/1990 | Keys | 210/729 |
| 5,167,831 | 12/1992 | Dimas | 210/729 |

FOREIGN PATENT DOCUMENTS

| | | |
|---|---|---|
| 40072 | 4/1990 | Australia . |
| 0417360 | 3/1991 | European Pat. Off. . |
| 120801 | 7/1976 | Fed. Rep. of Germany . |
| 56-72083 | 6/1981 | Japan . |
| 2184036 | 6/1987 | United Kingdom . |

*Primary Examiner*—Peter A. Hruskoci
*Attorney, Agent, or Firm*—Cushman, Darby & Cushman

[57] ABSTRACT

In the vacuum filtering of coal slurries, dewatering of the filter cake is achieved by contacting the coal with a $C_8$ to $C_{20}$ aliphatic carboxylic acid or a derivative thereof, especially sodium oleate. Reductions in moisture levels are thereby achieved in a cost-effective manner.

5 Claims, 3 Drawing Sheets

× 1g/L    □ 3g/L    ∗ 5g/L

COAL DEWATERING

This invention relates to improved dewatering methods and agents for use in vacuum filtration operations in coal processing.

BACKGROUND OF THE INVENTION

Coal processing, particularly the treatment of metallurgical coal, usually incorporates washing steps as part of the beneficiation scheme. Coal washing is primarily to remove undesirable gangue minerals from the coal, usually by froth flotation. The water used in the coal cleaning process must be removed for a number of reasons. Firstly, there are usually moisture-limit specifications on coal sold to industry by the coal producers. Moisture in coal results in increased freight costs and reduced thermal-energy value. Secondly, in many parts of the world, shipment of wet coal in winter results in problems in freezing of the coal in rail cars. Thirdly, refuse coal must be dewatered prior to disposal.

The coal-cleaning process produces coal with a broad range of particle sizes. Coarse coal (i.e., >600 micron) and fine coal are treated differently to dewater effectively. Water is usually removed from coarse coal by screen drainage or centrifugation and from fine coal (i.e., flotation concentrates or refuse) by centrifugation or vacuum filtration. In some cases, thermal drying of fine coal is employed as a necessary step to achieve target moistures. Depending upon the mining operation, the type of coal treated and normal swings in process operations in the plant, the moisture levels in the cleaned coal can vary quite widely. Typical moisture levels in coarse coal range from 2–12%, while fine coal moistures can range from 15–30%.

Coal processing plants often have considerable trouble meeting target moisture levels in the product coal they sell. As a result of new mining methods employed in long-wall operations, the proportion of fine coal reporting to the prep plants has increased significantly. Fine coal is much more difficult and costly to dewater than coarse coal. One method often employed by coal prep plants to achieve moisture specifications is to blend high-moisture fine coal with low-moisture coarse coal in proportions necessary to just meet target moisture. While, in many cases, it would be much more cost effective for a coal prep plant to simply discard the fines and mine more coarse coal, for reasons of resource management/utilisation/conservation it is more prudent to treat the fines.

Vacuum filtration is the most commonly used means of mechanical treatment to dewater fine coal. Fine coal, in slurry form, reports to the filtration operation where the water is removed. Vacuum disc filters are the principal type used by the coal industry to filter fine coal, although vacuum belt filters are being utilised on an increasing basis. To assist in the efficient operation of vacuum filters, reagents are often added to the feed slurry.

The coal industry has been using anionic flocculants and cationic coagulants in the vacuum filtration of fine coal for a long time. These reagents are necessary to 'thicken' the slurry as it is fed to the vacuum filter to ensure the proper formation of a filter cake. It is thought that the reagents function by binding the very fine coal particles to larger coal particles in a typical flocculation/coagulation process, thus producing a more uniform particle size distribution in the filter cake. This results in better permeability of the filter cake and less 'blinding' of the filter cloth by the very fine coal particles.

Both anionic flocculants (usually high molecular weight acrylamide/acrylate co-polymers) and cationic coagulants (usually low molecular weight polyamines) are used, individually or in combination, to control filter cake formation. These reagents are always added to the slurry feeding the vacuum filters (i.e., slurry pretreatment) in a manner typical of flocculant/coagulant addition in the minerals industry.

There has also been considerable interest by the coal industry in the use of surfactants, in combination with flocculants/coagulants, to enhance the dewatering of fine coal. Although many studies have been conducted and reported, there are widely varying results/conclusions. Some studies have shown that surfactants do not significantly affect residual cake moisture, while others show they do. Other studies conclude that surfactants can be effective for certain types of coal but not for others.

One of the most significant reasons for the variation in the performance of dewatering aids for fine coal is the variable chemistry of coal itself. Unlike all other minerals, coal is an organic material. Coals vary widely in bulk/surface composition, depending upon a multiplicity of factors such as location of the deposit, rank and mineral (inorganic) matter, degree of weathering, internal structure/porosity, etc. Therefore, depending upon the specific coal treated, dewatering aid performance can be expected to vary widely since both the adsorption (a surface chemical property) and absorption (a bulk chemical property) characteristics of coals with respect to drainage aid interaction will vary widely.

Regardless of the conclusions in the various studies related to the performance of dewatering aids, virtually every published fine-coal filtration study has concluded that surfactant utilisation to improve fine-coal dewatering is uneconomical. Surprisingly, most of the studies reported have limited the surfactants examined as dewatering aids for fine coal to detergents such as ethoxylated alcohols, alkyl sulfosuccinates, and alkyl sulfates. These are the most commonly used surfactants as drainage aids by the minerals industry but they are expensive and adsorb strongly onto coal surfaces. Surfactant adsorption increases reagent demand and is usually the most significant cause of cost inefficiency of dewatering aids for mineral filtration. United States patent specification U.S. Pat. No. 4,447,344 (Roe-assigned to Nalco Chemical Company) discloses that a blend of a nonionic with a hydrotrope (i.e., sodium xylene sulfonate) eliminates the problem of surfactant loss to the coal surfaces, in practise the technique does not achieve the objects of the present invention and excessively high reagent dosages are required.

United States patent specification U.S. Pat. No. 4,231,868 (Wang et al assigned to American Cyanamid Company) discloses surfactant and/or surfactant compositions specifically "designed" for improved coal dewatering.

However, despite the claims made as to the cost efectiveness of the reagents disclosed, one of these patents (U.S. Pat. No. 4,231,868) specifically recognises the need for improved (e.g., less costly) reagents.

It has been described in European Patent Application EP-A-0,417,360 that the dewatering of alumina trihydrate obtained by the Bayer process is improved by treating the alumina trihydrate with the product of mixing an alkaline liquor and a $C_8$–$C_{20}$ fatty acid or fatty acid precursor. As an example at least 5 grams/tonne of alumina trihydrate filtered of oleic acid is used. In this reference there is no indication or suggestion to use this system for coal dewatering and also the physico-chemical properties of alumina trihydrate particles are different from those of coal particles.

In American Patent U.S. Pat. No. 4,410,431 (Nalco Chemical Comp.) it has been proposed to alter the water function characteristics of coal particles by the application of a mixture of a surfactant material having an HLB number of 6.0–12.0 and a surfactant adsorption inhibitory amount (10–65 wt % of the mixture) of a fatty acid, like tall oil fatty acid. There is no indication or suggestion that in the absence of a surfactant excellent results may be obtained.

In East German Patent DD-A-0,120,801 (Koch et. al.) it has been proposed to use saturated or unsaturated fatty acids to improve the filtration of suspensions. The active agent can be added to the suspension and/or the washing water. As an example the filtration of sodium bicarbonate has been mentioned, but nowhere the use in coal filtration has been mentioned or suggested.

Finally, it has been proposed in Japanese Patent Application JP-A-56-072,083 (Nippon Oils & Fats KK) to separate water from a coal-water slurry in a two-stage process. In the first stage 10–3000 ppm of an anionic surface active agent, e.g. fatty acid soap, is added to a coal-water slurry with at most 80% by weight of coal particles having a particle size of at most 5 mm, after which the mixture is filtered or centrifuged. In order to remove sufficient water, however, a second treatment of the coal with a hydrocarbon, like kerosine, is required.

It is the object of this invention to provide a method and a dewatering aid to provide effective and economical coal dewatering treatment using inexpensive fatty acids or their derivatives without the need for expensive surfactants and/or emulsifiers. Fatty acids themselves are not considered to be surfactants because of their extremely low aqueous solubility.

DETAILED DESCRIPTION OF THE INVENTION

Figure 1:
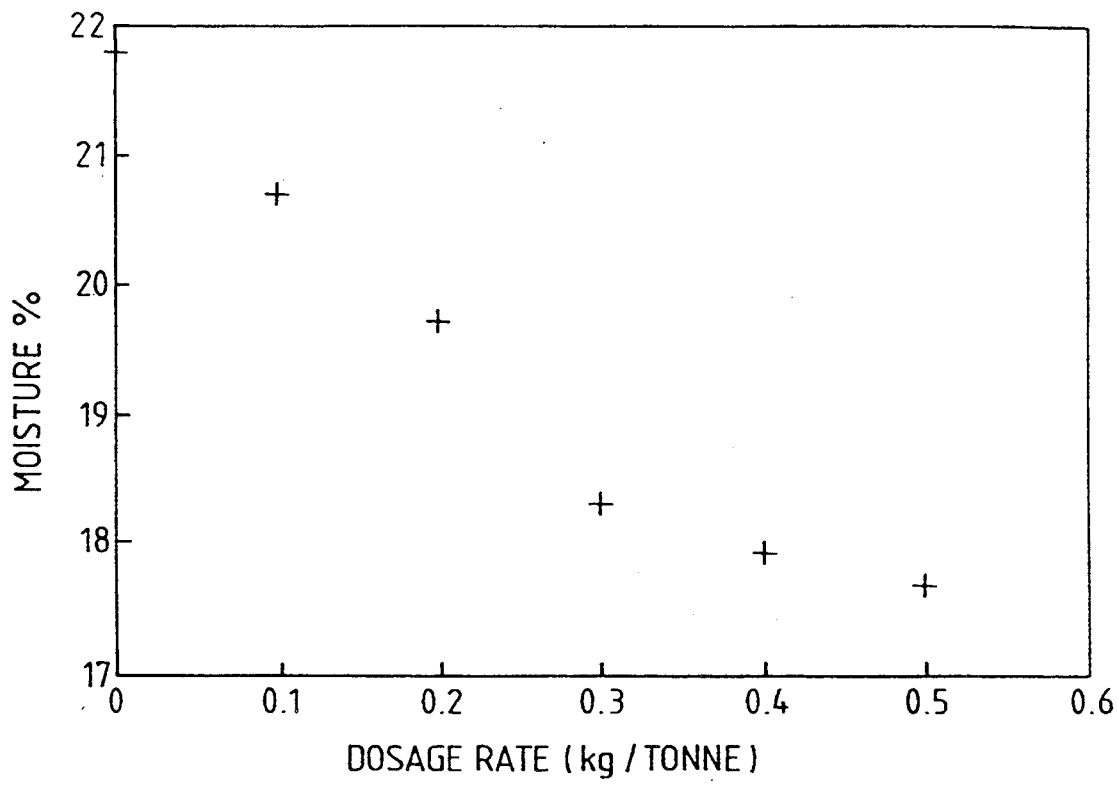
FIGS. 1–5 show graphically the test results from Examples 1 and 2.
Figure 2:
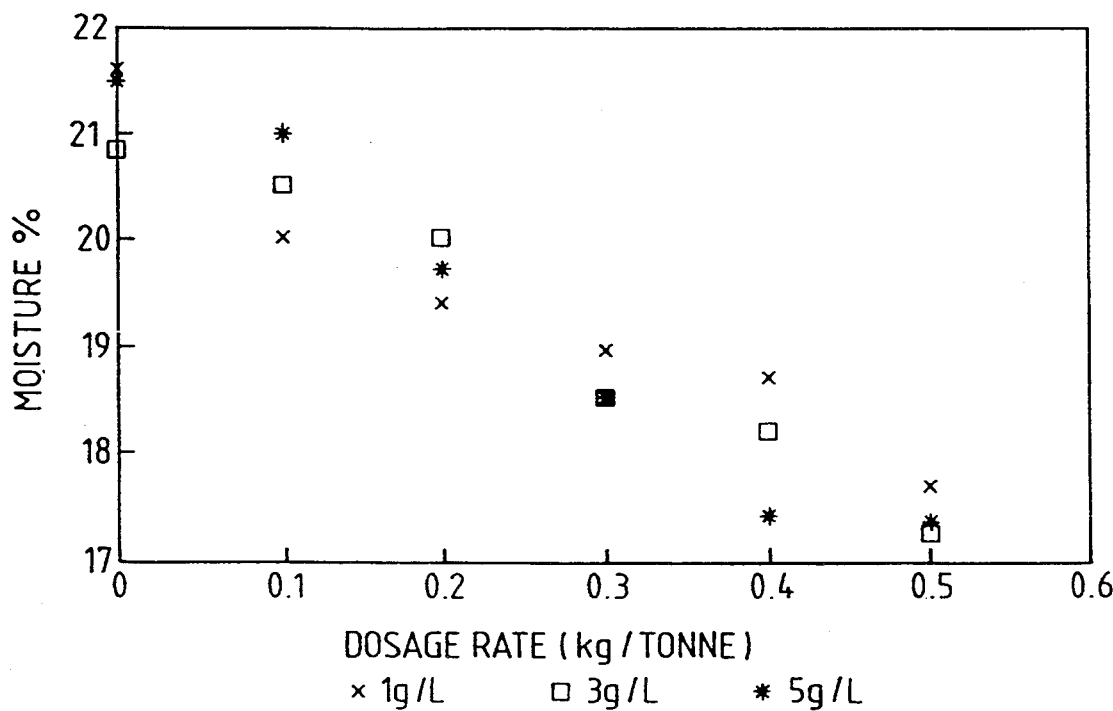

The present invention provides a method of improving the dewatering of coal which comprises contacting the coal either prior to or during the dewatering with a $C_8$ to $C_{20}$ aliphatic carboxylic acid or a derivative thereof such as an ester or amide or an alkaline earth or alkali metal salt or such acid. Blends of fatty acids are also useful. It is preferred to use salts as these are water soluble and may be formed in situ by the addition of caustic or alkaline liquors in conjunction with the fatty acid or fatty acid derivative.

The dewatering is preferably carried out with a pressure differential accross the filter cake of from 20 to 100 KPa preferably 30–60 KPa, and at a temperature of from 0° to 100° C. such as about ambient temperature. The coal slurry typically has a concentration of from 15 to 45% solids, by weight.

The content of the fatty acid used is at least 5 g per tonne of coal (filtered). There is no upper limit although cost effectiveness declines after dosages above 500 g per tonne.

Blends of fatty acid with other surface active chemicals is also within the scope of this invention. In particular pitch residues may be blended with the fatty acid to reduce costs without reducing dewatering effectiveness. Also industrial grade $C_8$ to $C_{20}$ carboxylic acids derived from tall oils, vegetable or animal source are equally effective and these are usually blends that incorporate carboxylic acid groups.

If a fatty acid salt is to be used rather than formed in situ as outlined above increased handling would be involved as the salts are usually powders which need to be dissolved prior to addition to the washing liquors and thus increased storage is required. By using normally liquid fatty acids this problem is avoided.

The fatty acid salt can be effectively and easily generated in line by small caustic additions to the wash liquor prior to the addition of the fatty acid. An in-line mixer may facilitate the conversion to the fatty acid salt.

Alternatively, a small fatty acid salt solution make-up facility can be installed to convert the fatty acid into the appropriate salt similar to a dry-polymer make-up facility using spent process liquor or by making small alkaline additions.

Short chain ($C_8$–$C_{12}$) saturated or long-chain unsaturated fatty acids are preferred. The most preferred fatty acids are those derived from natural sources, for example tallow, tall oil and oleic acid. Because these are readily available inexpensive products which are as effective as the prior art surfactant compositions significant cost savings can be made.

The alkaline earth and alkali metal salts are more effective than the fatty acid as a dewatering aid, especially at a pH above 8, such as about 10. The required pH may be achieved by the addition of caustic soda or soda ash to the process water as necessary. Since sodium salts of fatty acids are very soluble, their use eliminates the need for surfactants and emulsifiers which can be up to five times the cost of fatty acid. The amount of fatty acid required is preferably from 50 to 1000 g per tonne of coal (filtered).

The optimum quantity of fatty acid is approximately 200 to 700 g per tonne of coal, in particular from 200 to 500 g/t at a pH above 8, and from 500 to 700 g/t at a lower pH. Larger amounts generally produce no improvement in dewatering and smaller concentrations produce less dewatering.

Prior to filtering, a coagulant, such as an anionic coagulant or a cationic coagulant may be applied to the slurry.

The dewatering aid may be added to the filter cake in any convenient manner, capable of supplying an even distribution of reagent solution to the filter cake. We prefer to pressure-spray a solution of the dewatering aid from a position within the filter cake forming zone of the filter, and to do this just prior to the disappearance of the supernatant process water. This ensures even distribution without the dewatering aid becoming significantly diluted by the supernatant process water. Also, any negative interaction between the coagulant, if used, and the dewatering aid is minimised. A torpedo-spray system is particularly suitable for the application.

The invention will now be further illustrated with reference to several comparative experiments.

EXAMPLE 1

Laboratory test conditions were employed to simulate plant operating conditions as reported. These were:
a) BHP-Port Kembla Filter cake 20 mm
Vacuum 80 kPa
Surfactant addition 10 sec after cake formation
b) Bellamdi
Filter cake 18 mm
Vacuum 80 kPa
Surfactant addition 10 sec after cake formation
Dry time 60 sec
Residual filter cake moistures in the plant were reported to be:
a) BHP-Port Kembla
21-22% without surfactant
18-19% with surfactant
b) Bellamdi
23-24% without surfactant
18-19% with surfactant The reagent of this invention was sodium oleate formed by causticizing oleic acid.

Summary of Test Procedure

The slurry samples, as received, were pressure-filtered. Solids and filtrate were collected separately. The mass of wet coal necessary to give a 20 mm cake thickness was determined. For each individual test, the required mass of coal cample was recombined with an appropriate volume of filtrate (300 ml) in the test-rig to give the correct pulp density. The slurry was mixed and a vacuum applied to simulate the form time and dry time. Reagents were tested at 0-2 kg/tonne. Each run was repeated three times to ensure reproducibility of results.

Summary of Results

The results of the test work are shown in FIGS. 1 (BHP) and 2 (Bellamdi). A 4.0% moisture reduction in the coal samples was readily achievable using the sodium oleate. From the Figures, it appears that an optimum dose rate is approximately 0.4-0.5 kg/tonne. Although dosage rates higher than this do not significantly improve cake moistures, depending upon the cost of the reagent and the cost of drying, additional reagent addition may be cost-effective.

Conclusions

The test results show that sodium oleate is effective for improving the dewatering of fine coal. Comparable reductions in cake moistures are achieved at half the current commercial reagent application rate. In addition, the cost of the sodium oleate is approximately one third that of commercial drainage aids. Hence, the total drainage aid cost involved could be one sixth that of the present cost. Further reductions in plant moistures could be expected to occur with fine tuning of the process to meet individual plant requirements.

EXAMPLE 2

The following plant conditions were used:
Specific Gravity 1.4
Pulp density 30% Solids by weight
Cake thickness 22 mm=about 20 mm
form time 20-22 seconds (time for liquid to disappear and cake to form)
Vacuum=18-22 in Hg=about 80 kPa
Procedure The sample slurry was filtered and the mass of coal necessary to give a 20 mm cake thickness was determined. The required mass of coal, (approximately 120 g per sample) was weighed out. For each individual test a sample was placed in the dewatering rig while about 300 ml of filtrate was added to give a pulp density of 30% solids by weight. The mixture was throroughly stirred to obtain a homogeneous slurry. A vacuum of 80 kPa was then applied to the sample over a period of approximately 20-30 seconds to simulate the form time with further time allowed for the dry time. For the first series of test runs conducted a 1 g/l stock solution of the drainage aid (sodium oelate) was used and applied at the following plant dosage rates of 0, 0.1, 0.2, 0.3, 0.4 and 0.5 kg/tonne. Each run was repeated three times to determine the reproducibility of the results. Additional tests were carried out using 3 and 5 g/l solutions of the drainage aid as per the above plant dosage rates. This was done to investigate the effect of changing the drainage aid concentration in the wash.

Although the cost of sodium oleate is low compared with other commercially available drainage aids (approximately one third) it was decided to investigate the use of soidum oleate and pitch blends as a possible alternative drainage aid applicable to coal dewatering. Historically pitch residues are less expensive than sodium, hence a sodium oleate pitch blend would represent an even more cost effective drainage aid if successfully applied.

The effect of sodium oleate and various pitch residue blends on coal dewatering was therefore investigated. A series of blended mixtures ranging from 100% sodium oleate to 100% pitch were prepared as 10 g/l solutions. Dosage profiles were performed using a fixed dosage rate to give equivalent plant dosage rates of 0.5, 1.0 and 2.0 kg/tonne.

Results

Figure 3:
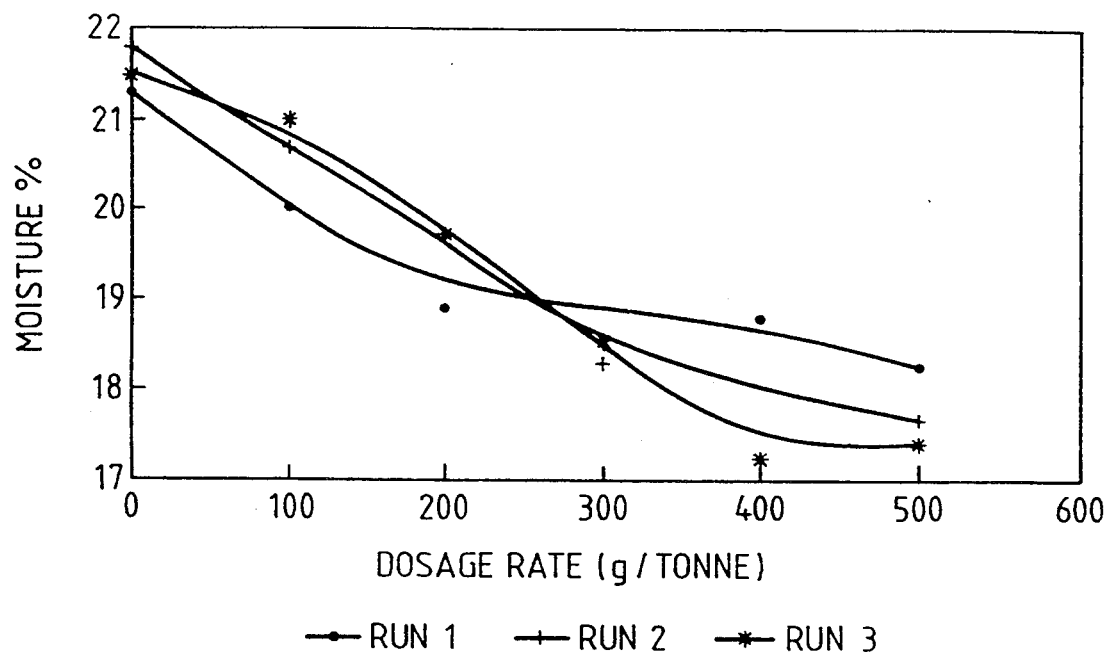
Figure 4:
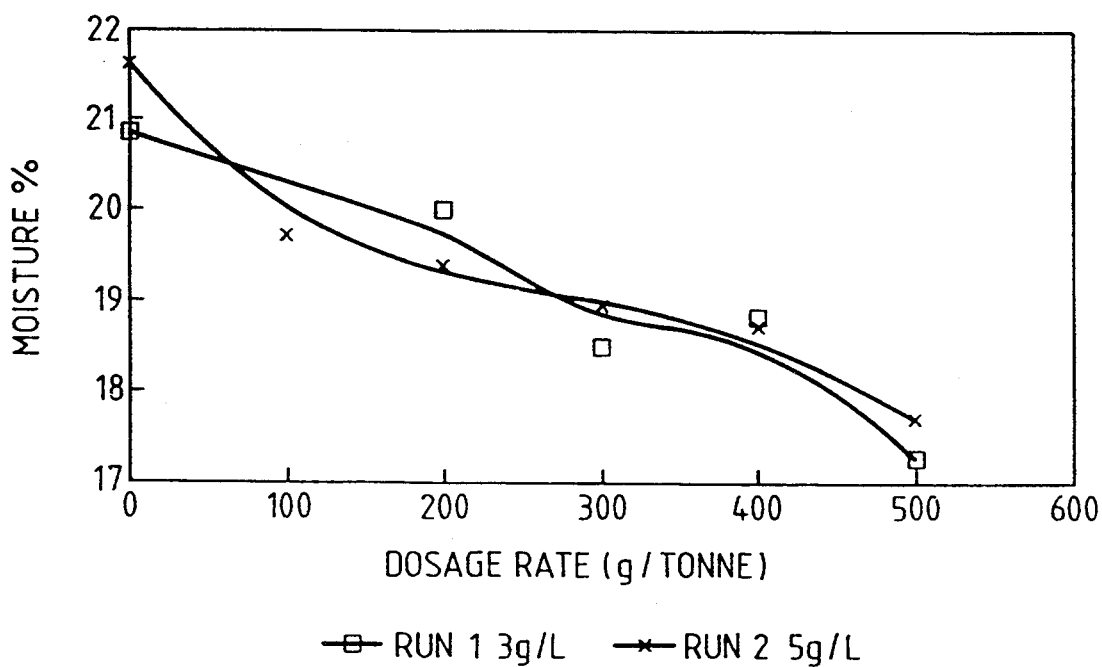

A 4.0% moisture reduction was obtained using the drainage aid process of this invention on the samples supplied. This was observed for all three concentrations investigated. Percentage moistures were reduced from 22% without sodium oleate (21-23% in the plant) to 18% with sodium oleate. From FIGS. 3 and 4 it can be seen that an optimum dose rate is approximately 0.4-0.5 kg/tonne. Similar results were observed for all three drainage aid concentrations (1, 3 and 5 g/l) that were used. Thus dosage rates higher than the optimal dosage rate do not significantly improve cake moistures. This was shown in a further test where the cake was dosed at 2 and 3 kg/tonne. The results obtained produced cake moistures between 16.5 and 17.0%, thus representing only a 1-1.5% improvement for a 500% increase in reagent dosage rate.

Figure 5:
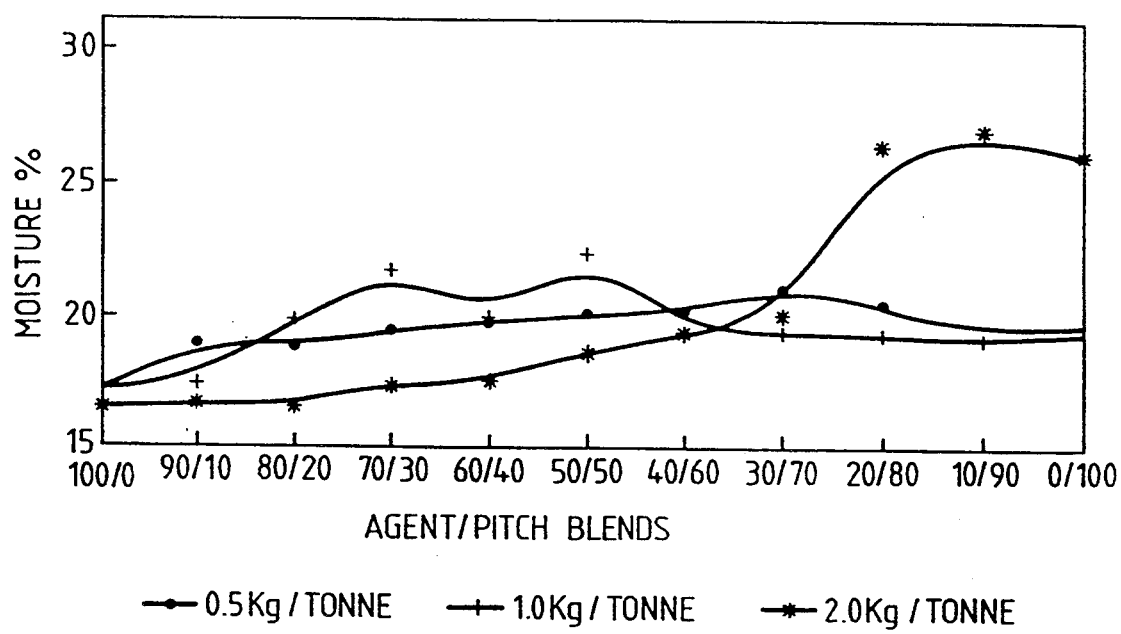

The results from the sodium oleate and pitch residue blends tested are shown in FIG. 5. This shows that dewatering performance decreases with increasing pitch residue concentration. At a dosage rate of 2 kg/tonne a significant reduction in moisture is observed i.e. 16-17%, for blend mixtures as low as 70/30 sodium oleate pitch blend. At dosage rates of 0.5 and 1 kg/tonne percentage moisture is reduced to only 20% with a 70/30 sodium oleate pitch blend. Conversely at a dosage rate of 2 kg/tonne and a 30/70 sodium oleate pitch blend, percentage moisture increases significantly. This could possibly be due to an increase in the viscosity of the wash water resulting from a higher concentration of pitch residue.

Sodium oleate helps maintain vacuum pressure by sealing the pores in the filter cake. This has been shown to contribute to its effectiveness as a dewatering aid. In the coal dewatering tests vacuum pressures tended to drop from an initial pressure of 80 kPa to 65-70 kPa without dewatering aid, and would rise to 75-79 kPa at dosage rates in excess of 0.3-0.4 kg/tonne.

It was noted that sodium oleate was completely adsorbed by the filter cake at dosage rates up to approximately 1 kg/tonne. Higher dosage rates resulted in a small amount of foam in the filtrate.

Conclusion

The results show that the drainage aid process of this invention can readily be applied to coal dewatering. The performance of sodium oleate in the tests conducted shows that cake moistures can be reduced by at least 4%. Such significant reductions in cake moistures represents substantial savings in overall plant operations, since the dosage rate involved (0.5 kg/tonne) is about one half that is currently being used. In addition the cost of sodium oleate is approximately one third that of commercially available drainage aids. Sodium oleate is a very cost effective drainage aid since the total costs involved could be expected to be approximately one sixth that of the present costs. Further reductions in plant moistures could be expected to occur with fine tuning of the process to meet individual plant requirements.

EXAMPLE 3

In this example, laboratory equipment was used capable of enabling accurate simulation of a wide range of plant operations.

In the following tests, the following parameters were employed:
  30% fine coal slurry density
  2 cm filter cake
  50–60 second filter-cake form time (using coagulant)
  130 sec total filtration time
  90 KPa vacuum
  250 g/tonne coagulant addition to the slurry.

In one series of tests various soaps were used as dewatering aids as follows:
  i) sodium stearate
  ii) potassium stearate
  iii) sodium tallowate
  iv) potassium tallowate
  v) sodium soap of short chain fatty acids (Na-SCFA)
  vi) potassium soap of short chain fatty acids (K-SCFA)
  vii) sodium soap of distillation residues (Na-DR)
  viii) potassium soap of distillation residues (K-DR)
  ix) sodium soap of resplit distillation residues (Na-RDR)
  x) potassium soap of resplit distillation residues (K-RDR)
  xi) tall oil fatty acid sodium soap.

Each reagent was tested over the range of additive concentrates from 0.2 to 0.8 Kg/tonne coal, and compared with no addition, and with the addition of sodium oleate.

The results were approximately as follows:

| Additive | Level (Kg/t) | Moisture content (%) |
|---|---|---|
| None | — | 23.3 |
| Sodium oleate | 0.2 | 20.6 |
|  | 0.3 | 19.3 |
|  | 0.4 | 18.6 |
|  | 0.5 | 18.9 |
|  | 0.7 | 18.3 |
| Sodium stearate | 0.2 | 21.6 |
|  | 0.3 | 23.1 |
|  | 0.4 | 23.2 |
|  | 0.5 | 23.2 |
|  | 0.7 | 23.7 |
| Potassium stearate | 0.3 | 22.8 |
|  | 0.5 | 23.2 |
|  | 0.7 | 23.1 |
| Sodium tallowate | 0.2 | 23.2 |
|  | 0.3 | 21.8 |
|  | 0.4 | 21.9 |
|  | 0.5 | 22.8 |
|  | 0.7 | 22.5 |
| Potassium tallowate | 0.2 | 21.9 |
|  | 0.3 | 21.9 |
|  | 0.4 | 22.4 |
|  | 0.5 | 21.8 |
| Na-SCFA | 0.2 | 19.8 |
|  | 0.3 | 19.2 |
|  | 0.4 | 19.2 |
|  | 0.5 | 18.2 |
|  | 0.7 | 18.3 |
| K-SCFA | 0.2 | 21.0 |
|  | 0.3 | 19.4 |
|  | 0.4 | 19.3 |
|  | 0.7 | 18.3 |
| Na-DR | 0.2 | 21.0 |
|  | 0.3 | 20.5 |
|  | 0.4 | 20.1 |
|  | 0.5 | 19.3 |
|  | 0.7 | 19.2 |
| K-DR | 0.2 | 22.1 |
|  | 0.4 | 21.2 |
|  | 0.5 | 21.0 |
|  | 0.7 | 20.7 |
| Na-RDR | 0.2 | 21.6 |
|  | 0.3 | 20.0 |
|  | 0.7 | 19.1 |
| K-RDR | 0.2 | 22.9 |
|  | 0.4 | 21.0 |
|  | 0.5 | 20.1 |
|  | 0.7 | 19.9 |
| Tall oil soap | 0.2 | 19.9 |
|  | 0.3 | 19.6 |
|  | 0.5 | 17.9 |
|  | 0.75 | 18.0 |
|  | 1.0 | 18.0 |

Conclusions

In the case of stearate and tallowate soap there is an initial decrease in moisture content as the level of application increases, but this improvement is lost on further application. This is thought to be due to loss of filter cake permeability during dewatering induced by long chain, saturated fatty acid soaps. This problem is not observed with soaps of short chain fatty acids, which perform comparably with sodium oleate.

EXAMPLE 4

Following the procedure described in Example 3, using sodium oleate as the dewatering aid, the pH of the wash water was varied using hydrochloric acid or caustic soda. Some results were as follows:

| Additive level (Kg/t) | pH | Moisture content (%) |
|---|---|---|
| 0.2 | 7 | 20.6 |
| 0.3 | 7 | 19.3 |
| 0.4 | 7 | 18.6 |
| 0.2 | 10 | 19.6 |
| 0.3 | 10 | 18.3 |
| 0.4 | 10 | 18.4 |

There is a substantial improvement in performance of sodium oleate as the pH of the wash water is raised above pH8, particularly if the pH is raised to 10. Thus the use of pH10, enables moisture content reductions of 4–5% with as little as 0.2–0.3 Kg/t sodium oleate.

A similar experiment in which the level of calcium and magnesium ions in the process water was varied, gave no significant differences in the results.

In all the above examples, the dewatering aid was applied to the filter cake by means of a torpedo-spray system. This was found to be the most effective method for delivery of the reagent to the filters. An even, powerful spray of the reagent solution perpendicular to the filters can be achieved. This ensured complete mixing of the reagent with the supernatant process water. Thus while the best results achievable with sodium oleate using a torpedo spray were a moisture content reduction of about 5.0%, this figure fell to 3% when trough application was used. The use of a fan spray gave results comparable to a torpedo spray.

I claim:

1. A process for dewatering an aqueous coal slurry filter cake comprising spraying the coal slurry filter cake with at least 5 g per tonne of filtered coal of a dewatering aid consisting essentially of a $C_8$ to $C_{20}$ aliphatic carboxylic acid or a derivative thereof selected from esters, amides and salts of fatty acids and applying a pressure differential across the cake to remove water therefrom.

2. A process according to claim 1, wherein the aliphatic carboxylic acid derivative is a salt of a fatty acid formed in situ by the addition of alkali together with a fatty acid.

3. A process according to claim 1, wherein the dewatering aid is added at a concentration of from 50 to 1000 g per tonne of filtered coal.

4. A process according to claim 1, wherein the dewatering aid is added in the form of an aqueous solution having a concentration of from 1 g/l to 10 g/l.

5. A process according to claim 1, wherein the dewatering aid is sodium oleate.

* * * * *

UNITED STATES PATENT AND TRADEMARK OFFICE
CERTIFICATE OF CORRECTION

PATENT NO. : 5,346,630
DATED : September 13, 1994
INVENTOR(S) : KEENEY

It is certified that error appears in the above-indentified patent and that said Letters Patent is hereby corrected as shown below:

On the title page, under item [19], change "Kenney" to —Keeney—; and

"[75] Inventor: Mark E. Kenney, South Perth, Australia" to

—[75] Inventor: Mark E. Keeney, South Perth, Australia—.

Signed and Sealed this

Sixteenth Day of May, 1995

Attest:

BRUCE LEHMAN

Attesting Officer     Commissioner of Patents and Trademarks